United States Patent [19]

Binns et al.

[11] 4,262,884

[45] Apr. 21, 1981

[54] FENCING WITH LINE WIRE TENSIONER

[75] Inventors: Julian R. H. Binns; Kenneth H. Grange, both of London, England

[73] Assignee: Binns Fencing Limited, London, England

[21] Appl. No.: 94,182

[22] Filed: Nov. 13, 1979

[51] Int. Cl.³ ............................................. E04H 17/02
[52] U.S. Cl. ..................................... 256/42; 254/224
[58] Field of Search ..................... 256/42, 43, 44, 40, 256/41; 254/162, 163, 83, 224, 223

[56] References Cited

U.S. PATENT DOCUMENTS

| 192,494 | 6/1877 | Duffey | 256/42 |
| 445,330 | 1/1891 | Kiler | 256/42 |
| 596,987 | 1/1898 | Diller | 256/42 |
| 601,272 | 3/1898 | Neil et al. | 256/43 |

Primary Examiner—Andrew V. Kundrat
Attorney, Agent, or Firm—Berman, Aisenberg & Platt

[57] ABSTRACT

A line wire tensioner is received in a channel extending longitudinally of a post, and the tensioner can be slid along the channel to a desired height where it is retained by suitable means such as one or more screws.

6 Claims, 1 Drawing Figure

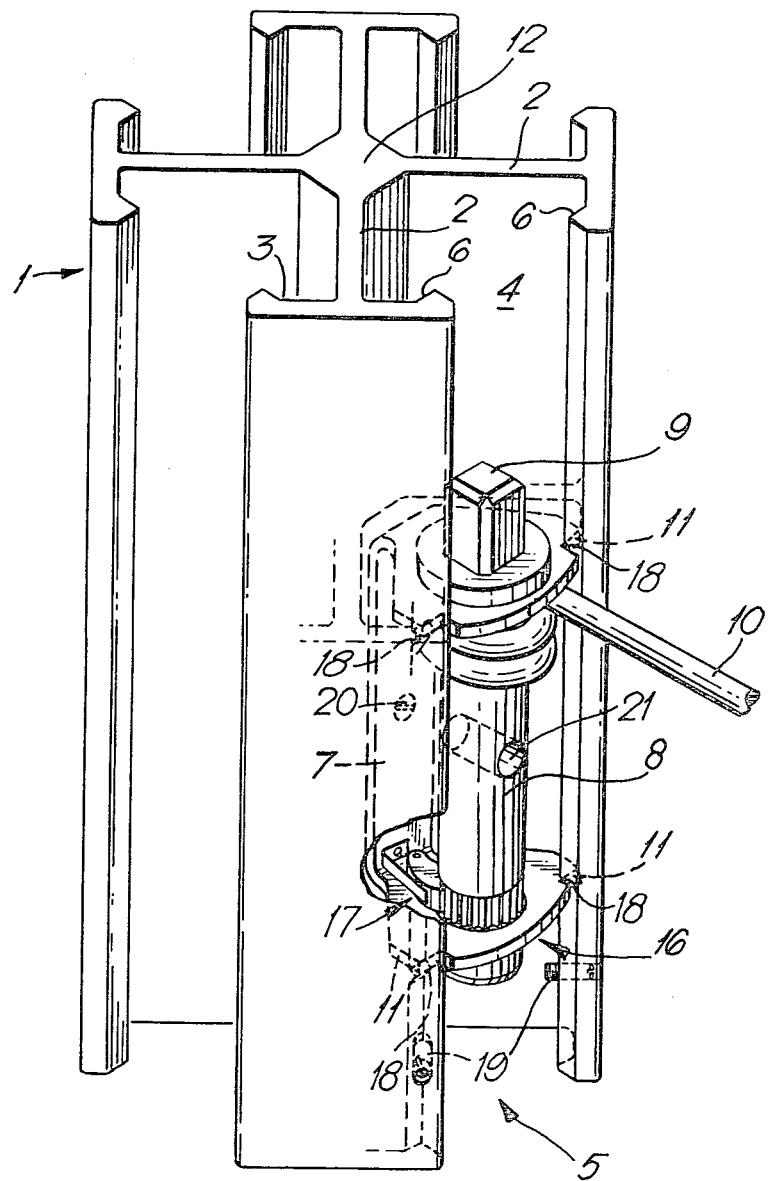

FENCING WITH LINE WIRE TENSIONER

This invention relates to fencing in which line wires of fencing material are secured to main posts and are held under tension to hold the fencing material in place.

An example of fencing material which employs line wires is chain link fencing which comprises a top line wire from which other wires extend downwardly along a zig-zag path with adjacent wires interlinked to form a diamond pattern. At the bottom of the fencing material, the zig-zag wires may be twisted together, or they can be secured to a further line wire, i.e. a bottom wire.

It has been proposed to provide a channel-section fence post and to mount a pin to extend through boles in side walls of the channel-section post so that the pin is rotatable about a horizontal axis. The line wire is wound round the pin which can be rotated to tension the line wire. A disadvantage of the above system is that it is time-consuming to assemble, and in order to permit the pin to be mounted at different heights according to particular requirements various pairs of holes must be provided along the height of the post.

An aim of the present invention is to provide an improved method of mounting a line wire tensioner on a fence post, and accordingly the invention is directed to fencing in which a line wire tensioner is received in a channel extending longitudinally of the post in such a manner that the tensioner can be slid along the channel to a desired position.

The tensioner preferably comprises a frame or housing mounting a pin for rotation about a vertical axis, an end of the pin being accessible to a tool for rotating the pin. The line wire will be wound onto the pin, and suitable means (e.g., a ratchet device) must be provided to prevent the pin from unwinding.

Preferably retaining means on the tensioner, for example, a grub screw, are provided to retain the tensioner at a desired height on the post.

A preferred embodiment of a fencing according to the invention will now be described with reference to the accompanying drawing, the single FIGURE of which is a perspective view of a line wire tensioner mounted in a fence post.

The drawing shows a main post 1 of a fence, the post comprising an aluminium extrusion. It comprises (as viewed in cross-section) four T-shaped parts, each part comprising a stem portion 2 and a bar portion 3. The bases of the stem portion 2 are connected together at a central part 12. The T-shaped parts define between them four open channels 4. At the mouth 5 of each channel the ends of the bar portions are enlarged to provide internal shoulders 6 extending the length of the post.

A line wire tensioner 16 is inserted into a channel 4 through the open top end of the channel, and the tensioner is then slid downwardly to a desired height. The tensioner 16 comprises a U-shaped frame 7 which mounts a pin 8 for rotation about a vertical axis. A square end 9 of the pin 8 projects upwardly beyond the frame 7, and a spanner or other tool can be inserted into the channel to engage the end 9 to rotate the pin. In a modification (not shown) the square end 9 could project downwardly beyond the frame 7. A line wire 10 is wound onto the pin, and a ratchet device 17 will be provided to prevent the pin from rotating under the tension of the line wire. Four abutments 11 on the frame 7 prevent it from being pulled out through the mouth 5 of the channel.

Various means could be provided for securing the tensioner at its desired height. For example, notches 18 could be provided inside the channel, the abutments 11 engaging in the notches. Alternatively, grub screws 19 could be inserted through holes in the post to engage the frame 7. However, both of these methods require subsequent work on the post after it has been extruded, and it is preferred to mount a grub screw 20 in the frame 7, which grub screw can be tightened by a screwdriver inserted through a hole 21 in pin 8. When tightened, the grub screw would engage the central base portion 12 of the channel.

If the fencing material has more than one line wire, then an appropriate number of line wire tensioners will be provided.

We claim:

1. Fencing comprising: a fence post to be retained in an upright position and having a channel extending longitudinally thereof; a line wire tensioner mounted in said channel and slidable along the channel to a desired height, said tensioner including a vertically disposed pin rotatable to tension said line wire; and retaining means to retain the tensioner at a said desired height, said retaining means comprising a screw mounted on the tensioner, said screw being positioned to engage said post when the screw is tightened whereby to prevent movement of the tensioner along the channel.

2. Fencing as claimed in claim 1, and including a U-shaped frame mounting said pin, a generally vertical wall forming part of said frame, said screw being mounted through said wall.

3. Fencing as claimed in claim 2, and including a hole in said pin, said hole serving for the passage through said pin of a tool for tightening the screw.

4. Fencing comprising: a fence post to be retained in an upright position and having a channel extending longitudinally thereof; a line wire extending from said post; a line wire tensioner mounted in said channel and slidable along the channel to a desired height, said tensioner including a vertically disposed pin rotatable to tension said line wire; and retaining means to retain the tensioner at a said desired height, said retaining means comprising a screw rotatably mounted on the post and arranged to engage the tensioner.

5. Fencing comprising: a fence post to be retained in an upright position and having a channel extending longitudinally thereof; a line wire extending from said post; a line wire tensioner mounted in said channel and slidable along the channel to a desired height, said tensioner including a vertically disposed pin rotatable to tension said line wire; and retaining means to retain the tensioner at a said desired height, said retaining means comprising abutments on said tensioner and co-operating notches on said post to receive said abutments.

6. Fencing comprising a fence post to be retained in a generally upright position, and a line wire tensioner carried by the fence post, the fence post comprising an extrusion the cross-section of which comprises four generally T-shaped parts, each said part comprising a stem portion extending from a central region of the post and a bar portion carried by the stem portion, said generally T-shaped parts defining between them four open channels; said bar portions having enlarged end regions which provide at the mouth of each channel internal shoulders extending along the length of the post, the line wire tensioner being mounted in one of said channels and being slidable along the post to a desired height, said line wire tensioner comprising a frame, and a pin on which a line wire is wound, said pin being mounted by the frame for rotation about a vertical axis, a portion of said pin extending beyond the frame so as to be accessible to a tool for rotating said pin to tension the line wire, the frame having abutments which engage said shoulders, said tensioner comprising a ratchet device operable to prevent the pin from unwinding under line wire tension, retaining means being provided to retain the tensioner at a desired height on the post.

* * * * *